(12) United States Patent
Kaul et al.

(10) Patent No.: US 10,440,377 B2
(45) Date of Patent: Oct. 8, 2019

(54) MOTION ESTIMATION FOR VIDEO PROCESSING

(71) Applicant: Intel Corporation, Santa Clara, CA (US)

(72) Inventors: Himanshu Kaul, Portland, OR (US); Mark A. Anders, Hillsboro, OR (US); Ram K. Krishnamurthy, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 554 days.

(21) Appl. No.: 13/649,560

(22) Filed: Oct. 11, 2012

(65) Prior Publication Data

US 2014/0105303 A1    Apr. 17, 2014

(51) Int. Cl.
*H04N 11/02*      (2006.01)
*H04N 19/43*      (2014.01)
*H04N 19/567*    (2014.01)

(52) U.S. Cl.
CPC ........... *H04N 19/43* (2014.11); *H04N 19/567* (2014.11)

(58) Field of Classification Search
USPC .......................................................... 375/240
See application file for complete search history.

(56) References Cited

U.S. PATENT DOCUMENTS

| 6,289,434 | B1 * | 9/2001 | Roy | ................................. | 712/32 |
| 6,380,987 | B1 * | 4/2002 | Kametani | ..................... | 348/699 |
| 8,184,699 | B2 | 5/2012 | Krishnan | | |
| 8,705,615 | B1 * | 4/2014 | Jones | ........................ | H04N 7/50 |
| | | | | | 375/240.01 |
| 2003/0133500 | A1 * | 7/2003 | Auwera | ................. | H04N 19/63 |
| | | | | | 375/240.11 |
| 2003/0198295 | A1 * | 10/2003 | Chen | ...................... | H04N 5/145 |
| | | | | | 375/240.16 |
| 2005/0122876 | A1 * | 6/2005 | Fechner | ...................... | 369/59.21 |
| 2008/0151999 | A1 * | 6/2008 | Youn et al. | ............... | 375/240.03 |
| 2008/0181295 | A1 * | 7/2008 | Anders et al. | ........... | 375/240.01 |

(Continued)

FOREIGN PATENT DOCUMENTS

| CN | 101406056 A | 4/2009 |
| JP | 2012-182616 | 9/2012 |

(Continued)

OTHER PUBLICATIONS

Kaul, H., et al., "A 320 mV 56 µW 411 GOPS/Watt Ultra-Low Voltage Motion Estimation Accelerator in 65 nm CMO," IEEE Journal of Solid-State Circuits, vol. 44, No. 1, Jan. 2009, pp. 107-114.

(Continued)

*Primary Examiner* — Christopher S Kelley
*Assistant Examiner* — Asmamaw G Tarko
(74) *Attorney, Agent, or Firm* — Trop, Pruner & Hu, P.C.

(57) ABSTRACT

In accordance with some embodiments, the complexity of motion estimation algorithms that use Haar, SAD and Hadamard transforms may be reduced. In some embodiments, the number of summations may be reduced compared to existing techniques and some of the existing summations may be replaced with compare operations. In some embodiments, additions are replaced with compares in order to balance delay and area or energy or power considerations.

25 Claims, 4 Drawing Sheets

(56) References Cited

U.S. PATENT DOCUMENTS

| | | | | |
|---|---|---|---|---|
| 2008/0304557 A1* | 12/2008 | Hollis | | 375/231 |
| 2009/0147103 A1* | 6/2009 | Chao | H04N 5/2351 | 348/226.1 |
| 2009/0225845 A1* | 9/2009 | Veremeev | H04N 5/145 | 375/240.16 |
| 2011/0158317 A1* | 6/2011 | Krishnan | H04N 19/176 | 375/240.12 |
| 2011/0298986 A1* | 12/2011 | Schoenblum | H04N 5/213 | 348/699 |
| 2012/0082224 A1* | 4/2012 | Van Der Auwera et al. | | 375/240.12 |

FOREIGN PATENT DOCUMENTS

| | | |
|---|---|---|
| KR | 10-2011-0100912 | 9/2011 |
| KR | 10-2012-0072205 | 7/2012 |
| TW | 200926767 A | 6/2009 |

OTHER PUBLICATIONS

PCT International Search Report and Written Opinion issued in corresponding PCT/US2013/04033 dated Oct. 11, 2013, (10 pages).
CN Office Action in corresponding CN application No. 201380047412.4 dated Apr. 19, 2017 (5 pages) [No translation].
CN Office Action in corresponding CN application No. 201380047412.4 dated Jan. 2, 2018 (13 pages) [No translation].

\* cited by examiner

MOTION ESTIMATION FOR VIDEO PROCESSING

BACKGROUND

This relates generally to video processing and particularly to techniques for compressing video for transmission.

Video applications can be computationally expensive. Designers may compress video data to reduce computations associated with video data and to reduce the bandwidth required to transmit video data. For example, compression algorithms may take advantage of a high degree of correlation between successive video frames. One such technique is called motion estimation.

With motion estimation, a reference image, which is a previously encoded frame, may be subdivided into blocks of pixels, such as blocks of 4×4 or 16×16 pixels. An encoding algorithm matches this block to another block that is within a search window of a current frame.

When the best match between blocks in the reference and current frames is identified, a motion vector captures the movement of the block from the reference frame to the current frame. This motion vector may be encoded in lieu of encoding both frames. As a result, bandwidth and computation overhead may be reduced.

One method for determining how closely two blocks match one another is called the sum of absolute differences (SAD). For every search step within the search window of a macroblock in the reference frame, the SAD for the 256 pixels of the block is computed. The search may be continued until the best match with the lowest SAD is obtained. This operation may repeat for every macroblock in the reference frame. For high resolution video, the method requires computing the motion vector for thousands of macroblocks per second. Consequently, motion estimation is computationally expensive. Other techniques for determining the best matching block include the Haar transform and the Hadamard transform.

BRIEF DESCRIPTION OF THE DRAWINGS

Some embodiments are described with respect to the following figures.

DETAILED DESCRIPTION

Figure 1:
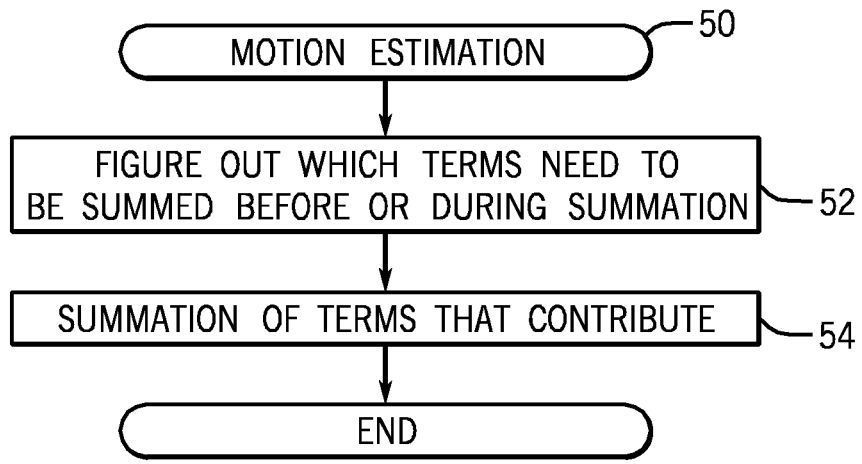
FIG. 1 is a flow chart for a sequence according to one embodiment of the present invention.

In accordance with some embodiments, the complexity of implementing motion estimation algorithms that use Haar, SAD and/or Hadamard may be reduced. This may reduce both power consumption and circuit footprint or area.

Using a Haar transform, in the context of motion estimation, actually refers to performing summation of absolute values of the transform. A Haar transform of a 4×4 input block of pixel differences will actually result in a 4×4 block. The sum of the absolute values of these transformed differences is used as the matching metric. Some may refer to this as the sum of absolute transformed differences (SATD). The conventional way is to first find all terms of the transform, find their absolute value and then sum them up. The final sum may be calculated without explicitly calculating all terms (and their absolutes) of the transform.

In some embodiments, the number of summations may be reduced compared to existing techniques and some of the existing summations/differences may be replaced with compare operations. Compare operations use less area and power within the integrated circuit die compared to additions/differences.

In some embodiments, the number of additions/differences that are removed is determined based on desired speed versus efficiency. For example, if more additions are replaced with compares, speed may be compromised but area and power may be reduced. Reducing the number of additions due to cancellation requires compares to determine which pixel differences cancel. These compares can be less expensive than additions based on area, delay, and power. However achieving the minimum number of additions can increase the overall delay since the compares must be done sequentially before additions.

For computing the Haar transform of a 4×4 block, the number of terms to be added can be reduced from 16 to 12. Depending on the signs of the terms, some of the pixel differences that are inputs to the transform end up cancelling during the summation and do not contribute to the ultimate result. But speed may be reduced by eliminating the maximum number of additions to enable use of a minimum number of addition terms. Achieving a minimum number of terms for the addition comes at the cost of reduced speed. In some embodiments, less than the maximum number of additions are replaced with compares in order to balance speed and area or footprint considerations. Performance can be maintained with more than the minimum number of additions but still have fewer additions than the conventional approach. In some embodiments, not reducing the number of additions to the minimum, results in a better balance between speed versus power.

In the following discussion, a motion estimation block that uses both a Haar and SAD transform is described. But in other embodiments, other transforms that require a number of additions may be used as well, including sum of absolute differences or SAD and Hadamard transforms, to mention some examples. Thus, the present invention is not limited to any specific algorithm for motion estimation. The current example is for a 4×4 block. The same approach can be extended to different sized blocks as well.

A Haar transform for a macroblock of 4×4 pixels in reference and current frames is conventionally believed to require 16 terms. This involves computing each of the terms, which are basically summations and differences, followed by taking their absolute values and then summing all of these absolute values. A compressor tree may be used to sum up the necessary absolute terms while the parallel outer tree computes the different Haar terms from the pixel inputs. The pixel inputs include the current frame pixel $c_i$ and the reference frame pixel $r_i$. The idea is to see how much the current pixel block varies in position from the reference pixel block in order to determine the motion vector to represent the current macroblock in a space efficient fashion. A required division by two, implicit within the Haar transform, is accomplished by simple shift operations, in some embodiments.

Reconfigurability of the hardware for SAD computations may be incorporated by mode based multiplexing between Haar and SAD terms before the absolute value computation.

Referring to FIG. 1, a technique 50 for motion estimation may be implemented in software, firmware and/or hardware. In software and firmware embodiments, it may be implemented by computer executed instructions stored in one or more non-transitory computer readable media such as optical, magnetic or semiconductor storages.

The motion estimation technique 50 may begin by figuring out which pixel differences contribute to the final result. This may be done before or during the summation of absolute values of Haar terms. Thus, there are 16 candidate terms consisting of pixel differences for summation and by analysis of their signs, one can determine which of the input pixel differences contribute to the output. In an exhaustive approach for a 4×4 macroblock, only a maximum of 12 terms actually need to be summed to obtain the final result. In some embodiments, more than 12 terms may be added in order to improve speed. In one exemplary embodiment, 13 terms are added.

While examples are given herein in terms of 4×4 blocks, the present invention is not limited to blocks of any particular size.

As indicated in block 54, terms that do not contribute may be eliminated, taking into account considerations of speed, and the remaining terms are added.

Figure 2:
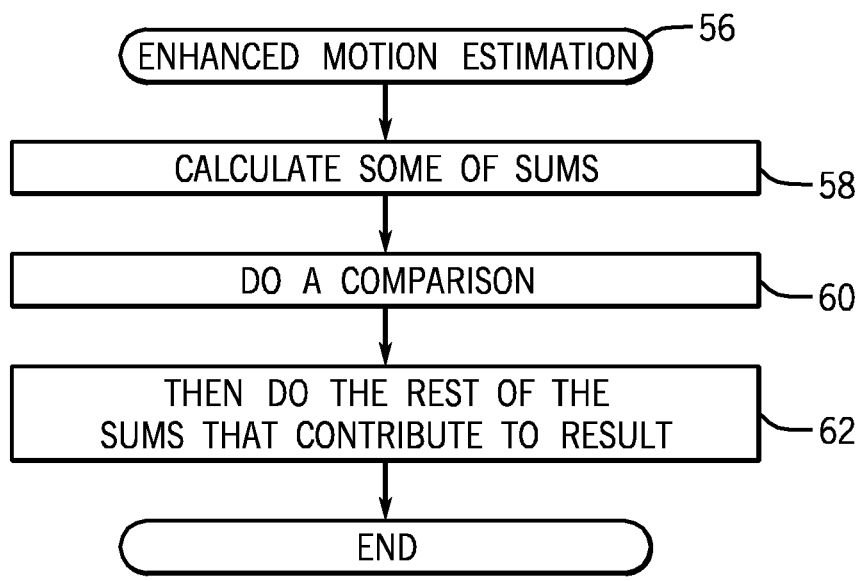
FIG. 2 is a flow chart for another sequence according to one embodiment of the present invention.

The consideration of speed is shown in the enhanced motion estimation algorithm 56 of FIG. 2. Here some of the sums are calculated as indicated in block 58. In parallel, a comparison is done to determine which ones of the terms contribute to the output as indicated in block 60. Then the rest of the sums that do contribute to the result are used in the continuing calculation as indicated in block 62. But of course it is not necessary in every embodiment to minimize the number of summations because minimizing the number of summations may result in a speed penalty in some cases. Thus, designers may wish to reduce the number of summations while achieving any necessary speed specifications.

Figure 3:
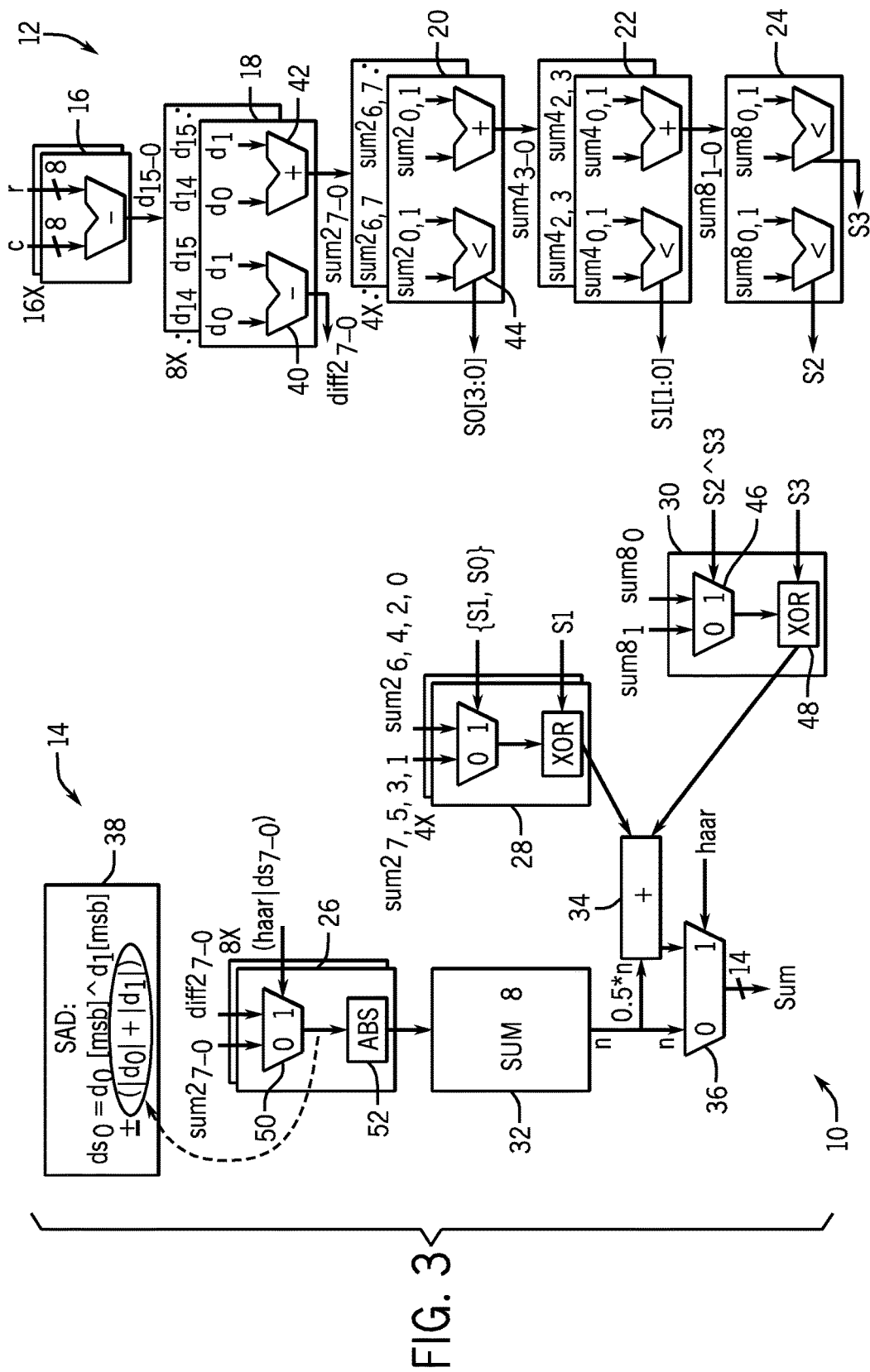
FIG. 3 is a circuit diagram for one embodiment of the present invention.

Thus referring to FIG. 3, a circuit for selectively implementing a Haar or SAD transform for motion estimation implements an optimized design for both reducing the number of additions and reducing any speed penalty from replacing additions with compares. However, in other embodiments, more or fewer additions may be done based on the need to increase speed or reduce power consumption or area consumption on the die.

The circuit includes three main parts, including a compressor tree 32 and 34, a parallel adder tree 12, and a circuit 14 to selectively implement SAD using the same circuitry. The parallel adder tree 12 computes terms for the Haar transform and some of these terms may be reused for the SAD calculation. The actual SAD of two pixel pairs is ready at the output of block 26. The circuit also includes a compressor tree 32 and 34 to sum up all the terms for both Haar and SAD transforms. In this adder tree, some adders are changed to comparators to find signs of sums of pixel differences. At a high level, the number of terms of the compressor tree reduces to 13 for the Haar transform, without increasing the critical path delay in some embodiments. This is achieved by replacing conventional additions/subtractions in blocks 20, 22 and 24 with compares 44 that determine which terms contribute to the final result. Additionally, the compare operations are more area and energy efficient, because they use fewer gates.

To achieve SAD instead of Haar functionality, first either the differences ($\text{diff2}_i$) or sums ($\text{sum2}_i$) of two pixel pair differences $d_i$ are picked based on their signs, as indicated at 38 in FIG. 3. These terms are already calculated for the Haar transform and the resulting absolute value represents the sum of absolute differences of two pixel pairs. The design shown in FIG. 3 only requires 8 of these terms to be summed for the SAD computation. The summing occurs in block 32. However additional sums may be done in the block 34 when the circuits are used for Haar transform.

The signal Haar is a select signal to the multiplexers 50 and 36 to select either the SAD or the Haar transform, enabling the sharing of many of the addition circuits.

In some embodiments, the addition of 8 out of 16 terms in a conventional Haar transformation may be reduced to adding only five terms using just signs of comparisons. Four of these five terms may be derived from a value sum $2_i$ by using the number itself or its 2× multiple followed by a conditional negation. The 2× multiple may be implemented by a shift left by 1. The terms Sum2 are basically the sum of two differences. Specifically, sum $2_i$ is equal to $d_i+d_i+1$. The term d is determined, as indicated in block 16 as a difference between a pixel in the current frame pixel $c_i$ and a reference frame $r_i$.

This subtraction is done 16 times in FIG. 3, resulting in differences $d_{15-0}$. In the next block 18, eight subtractions and additions are done using adders 42 and subtractors 40. This results in $\text{diff2}_{7-0}$ and $\text{sum2}_{7-0}$. This is followed by four summations in block 20 and 4 compares using comparator 44 resulting in an output S0[3:0]. So the result of a comparison between sum $2_{2i}$ and sum $2_{2i+1}$ where i changes from zero to three, basically determines whether the first value is larger than the second value in one embodiment.

The other output from block 20 is a sum $4_{3-0}$ which goes to the block 22. At the block 22, the sum $4_{3-0}$ is added two times in the adder 42 and compared two times in the comparator 40. The output of the comparator is S1[1:0] which is the determination of sum$4_i$ being greater than sum$4_{i+1}$, where sum$4_i$ is equal to sum$2_{2i}$+sum$2_{2i+1}$.

Finally, in block 24, only comparisons are done one time to get the output S2 from the comparator on the left and S3 from the comparator on the right. S2 is determined as sum$8_0$ being greater than sum$8_1$. Sum$8_i$ is equal to sum$_{2i}$+sum$4_{2i+1}$. S3 is equal to sum 16 being greater than zero, where sum 16 is equal sum$8_0$+sum$8_1$. When the Haar transform is being computed, 8 of the terms are absolute values of diff2. Summation of the other 8 absolute terms are reduced to adding 5 terms from sum2 and 1 from sum8.

The outputs from blocks 20 go to the block 28 which includes four units, each having a multiplexer 50 that receives inputs S1 and S0 to select between the odd and the even sum2. Out of every pair, either odd or even sum2 is picked. So all four selected terms need not be odd or even. The selected terms are independently negated based on the input S1 using XOR circuits. That output is then provided to the block 34.

The output from block 32, "n" may be divided in half using a shift operation and provided for summation in block 34. Then the outputs from the block 34 and the circuit 32 are provided to the multiplexer 36 which selects one of these outputs to be the resulting sum. Thus, 13 terms are summed using blocks 32 and 34. So all pixel inputs c,r are 8 bits and output is 14 bits.

The value sum$2_i$, $4_i$, $8_i$ and sum16 may be computed in succession by the parallel adder tree 12. Waiting for the signs of all these sums to be computed can result in a performance penalty. However, it is not necessary to wait for the final sum to be computed. For every pair of sum $2_i$ and $2_{i+1}$, one of them is selected and conditionally inverted for summation based on the comparison tests S0 and S1. When S2 and S3 comparison tests are computed later in the outer tree, either sum $8_0$ or sum $8_1$ are selected and conditionally inverted for addition/subtraction to compute the final output.

Figure 4:
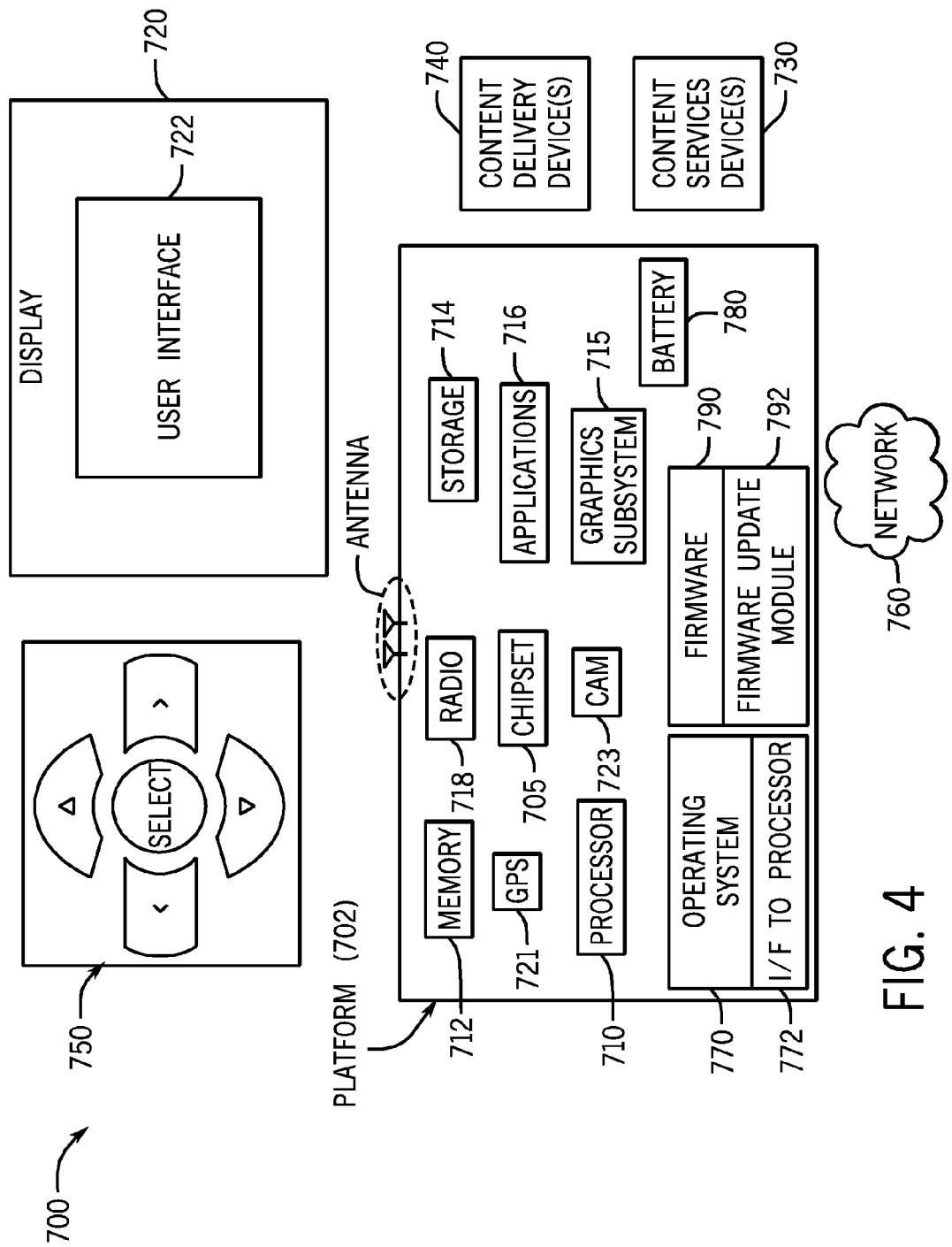
FIG. 4 is a system depiction for one embodiment of the present invention.

FIG. 4 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 4.

Figure 5:
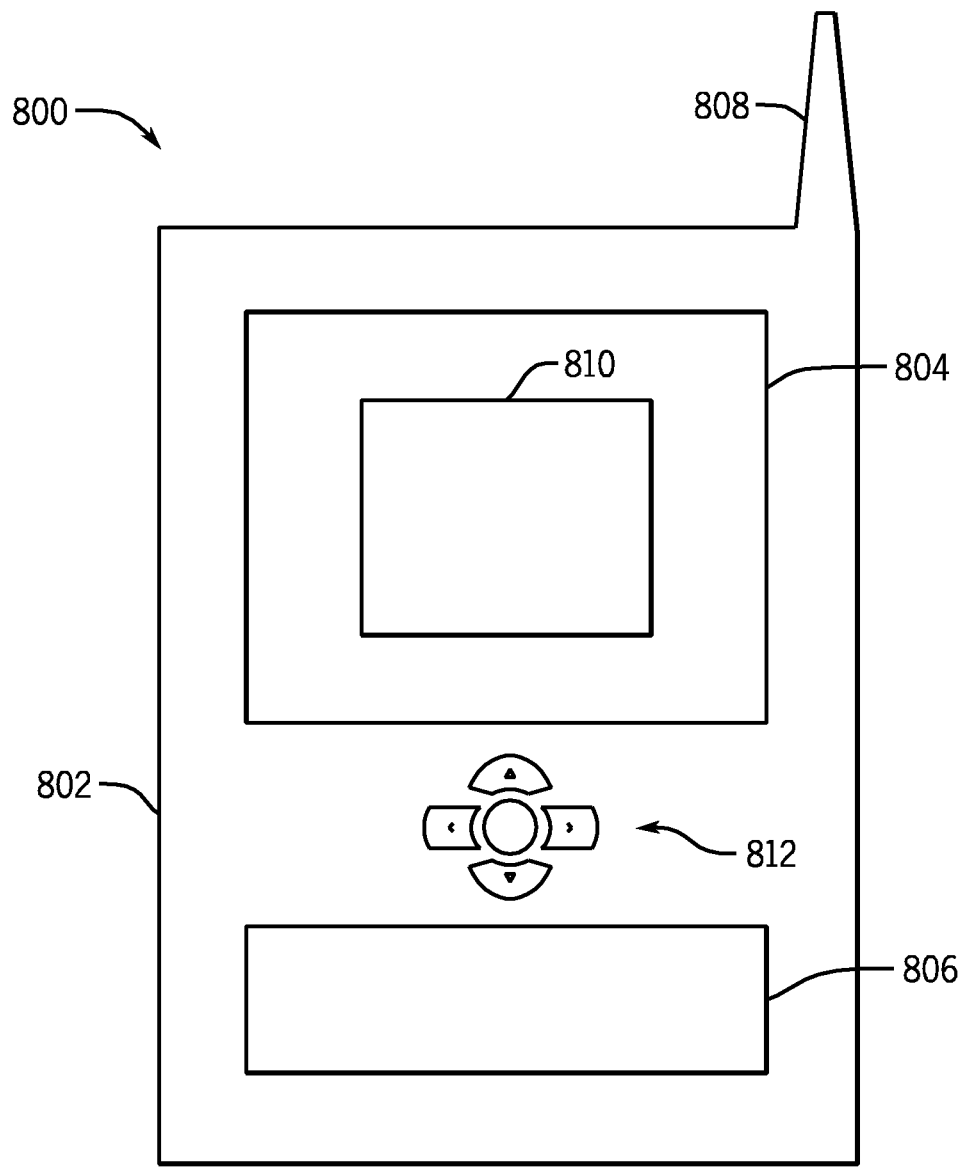
FIG. 5 is a front elevational view of one embodiment of the present invention.

As described above, system 700 may be embodied in varying physical styles or form factors. FIG. 5 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The processor 710 may communicate with a camera 722 and a global positioning system sensor 720, in some embodiments. A memory 712, coupled to the processor 710, may store computer readable instructions for implementing the sequences shown in FIGS. 1 and 2 in software and/or firmware embodiments.

As shown in FIG. 5, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
using a computer to perform motion estimation by determining a first number of pixel differences for summation that actually contribute to a summation output, said first number less than a second number equal to the first number plus pixel differences that do not contribute to the summation output; and
performing a third number of summations greater than said first number and less than said second number.

2. The method of claim 1 including reducing the number of additions to compute the sum of the absolutes of Haar transform terms.

3. The method of claim 1 including determining which of a plurality of summation terms need to be summed before or during the summation.

4. The method of claim 3 including eliminating at least one summation corresponding to inputs that do not contribute to the final result.

5. The method of claim 1 including using results from the summation subset to reduce the number of remaining summations.

6. The method of claim 5 including determining if inputs or intermediate terms will cancel out and not contribute to final result.

7. The method of claim 1 including performing additions of absolute values of terms of a Haar transform on a 4×4 block by summing less than 16 terms.

8. The method of claim 7 including doing addition of 13 terms.

9. The method of claim 2 including reducing the number of additions by resolving the signs of individual transform terms, so that contributions of some individual primary inputs to final sum of the absolute values can cancel out.

10. The method of claim 9 including determining the primary inputs that do contribute using compares to resolve signs of transform terms.

11. One or more non-transitory computer readable media storing instructions executed by a computer to perform a sequence comprising by determining a first number of pixel differences for summation that actually contribute to a summation output, said first number less than a second number equal to the first number plus pixel differences that do not contribute to the summation output; and
performing a third number of summations greater than said first number and less than said second number.

12. The media of claim 11 further storing instructions to perform a sequence including performing motion estimation by replacing adds with compares when performing one of a Haar transform, sum of absolute differences or a Hadamard transform.

13. The media of claim 11 further storing instructions to perform a sequence including determining which of a plurality of summation terms need to be summed before or during the summation.

14. The media of claim 13 further storing instructions to eliminate at least one summation corresponding to inputs that do not contribute to the final result.

15. The media of claim 11 further storing instructions to perform a sequence including using results from the summation subset to reduce the number of remaining summations.

16. The media of claim 15 further storing instructions to determine if inputs or intermediate terms will cancel out and not contribute to final result.

17. The media of claim 11 further storing instructions to perform a sequence including performing additions of absolute values of terms of a Haar transform on a 4×4 block by summing less than 16 terms.

18. The media of claim 17 further storing instructions to perform a sequence including doing additions of 13 terms.

19. The media of claim 12 further storing instructions to reduce the number of additions by resolving the signs of individual transform terms, so that contributions of some individual primary inputs to final sum of the absolute values can cancel out.

20. The media of claim 19 further storing instructions to determine the primary inputs that do contribute using compares to resolve signs of transform terms.

21. A motion estimation circuit comprising:
a compressor tree; and
a parallel adder tree coupled to said compressor tree, said adder tree to perform motion estimation by determining a first number of pixel differences for summation that actually contribute to a summation output, said first number less than a second number equal to the first number plus pixel differences that do not contribute to the summation output, and perform a third number of summations greater than said first number and less than said second number.

22. The circuit of claim 21 including a circuit to selectively implement sum of absolute differences.

23. The circuit of claim 21 said parallel adder tree to determine the primary inputs that do contribute using compares instead of additions or subtractions.

24. The circuit of claim 21 said parallel adder tree to determine which of a plurality of summation terms need to be summed before or during the summation.

25. The circuit of claim 24 including eliminating at least one term that does not contribute to the final result.

* * * * *